United States Patent [19]

MacCracken

[11] 4,112,921
[45] Sep. 12, 1978

[54] METHOD AND SYSTEM FOR UTILIZING A FLEXIBLE TUBING SOLAR COLLECTOR

[75] Inventor: Calvin Dodd MacCracken, Englewood, N.J.

[73] Assignee: Calmac Manufacturing Corporation, Englewood, N.J.

[21] Appl. No.: 846,112

[22] Filed: Oct. 27, 1977

Related U.S. Application Data

[63] Continuation-in-part of Ser. No. 790,484, Apr. 25, 1977, abandoned, which is a continuation-in-part of Ser. No. 692,887, Jun. 4, 1976, abandoned.

[51] Int. Cl.$^2$ ............................................. F24D 3/02
[52] U.S. Cl. ................................. 126/271; 165/176; 237/1 A
[58] Field of Search ............... 126/270, 271; 237/1 A; 165/171, 172, 173, 176

[56] References Cited

U.S. PATENT DOCUMENTS

| | | | |
|---|---|---|---|
| 3,299,881 | 1/1967 | Koch | 126/271 |
| 3,599,626 | 8/1971 | Bouse | 126/271 |
| 3,815,574 | 6/1974 | Gaydos | 126/271 |
| 3,823,703 | 7/1974 | Lanciault | 126/271 |
| 3,898,979 | 8/1975 | Medico, Jr. | 126/271 |
| 3,952,725 | 4/1976 | Edmundson | 126/271 |
| 3,965,887 | 6/1976 | Gremer | 126/271 |
| 4,026,272 | 5/1977 | Bottum | 126/271 |

Primary Examiner—Kenneth W. Sprague
Assistant Examiner—James C. Yeung
Attorney, Agent, or Firm—Parmelee, Johnson, Bollinger & Bramblett

[57] ABSTRACT

The practical large scale use of solar energy depends primarily upon the first cost of solar collectors per unit area being greatly reduced below known designs without loss of efficiency. The subject invention introduces a method of making flat plate solar collectors for heating liquid in which the use of metal and glass is almost totally eliminated, weight is greatly reduced, and assembly of the components is done at the site from rolls of flexible materials in lengths to fit the available space. While materials of much lower thermal conductivity than metal are used, the increased surface area and close spacing of liquid tubes provided by employing this invention more than make up for the lower conductivity. Standard insulation board covered with roofing cement and other adhesives serves as the base and frame to hold small synthetic rubber tubes, headers, and flexible cover material made of transparent fiberglass reinforced plastic. Field assembly assures participation of local personnel who are then prepared to sell, service and maintain the system. The cover material may be used in place of roofing across rafters and then insulation board covered with the rubber tubes and adhesive pushed up between the rafters from inside the roof space.

29 Claims, 11 Drawing Figures

Fig_1

U.S. Patent  Sept. 12, 1978  Sheet 3 of 6  4,112,921
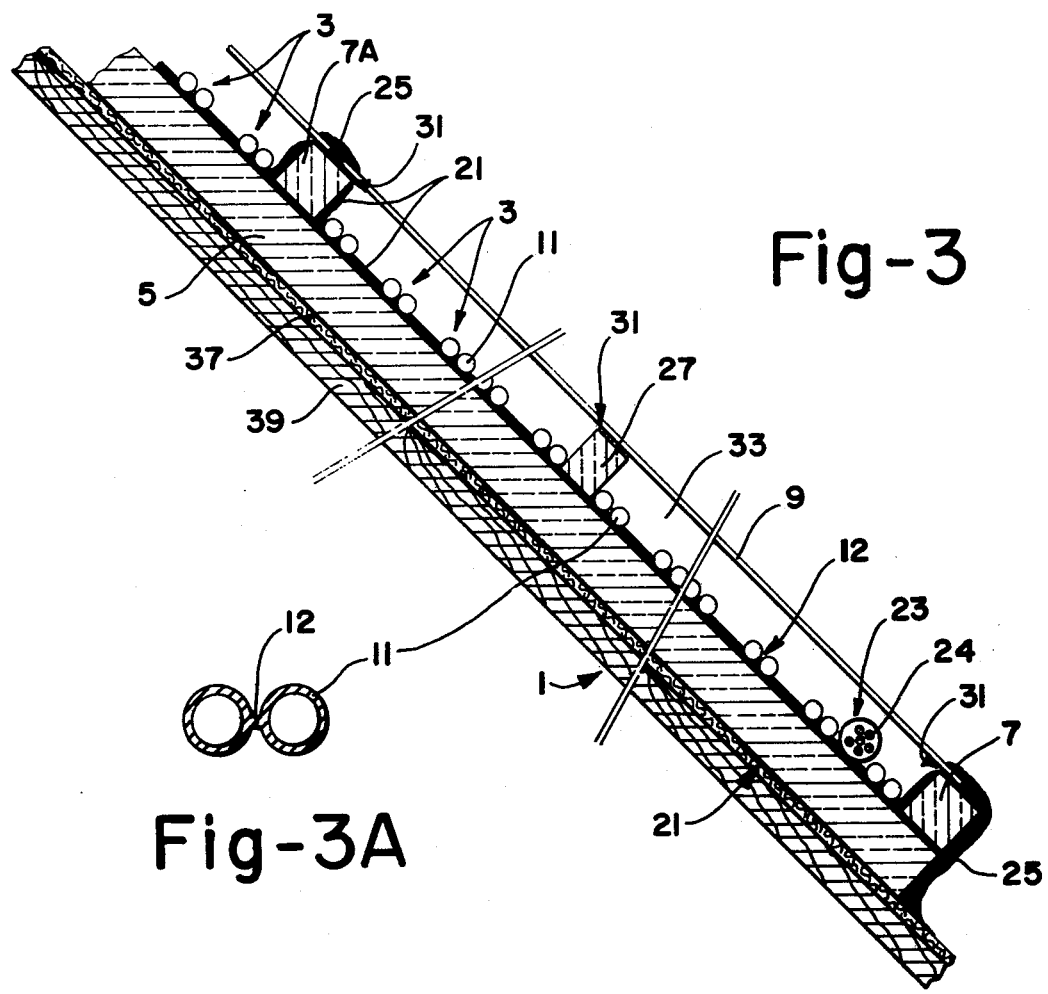
Fig-3
Fig-3A
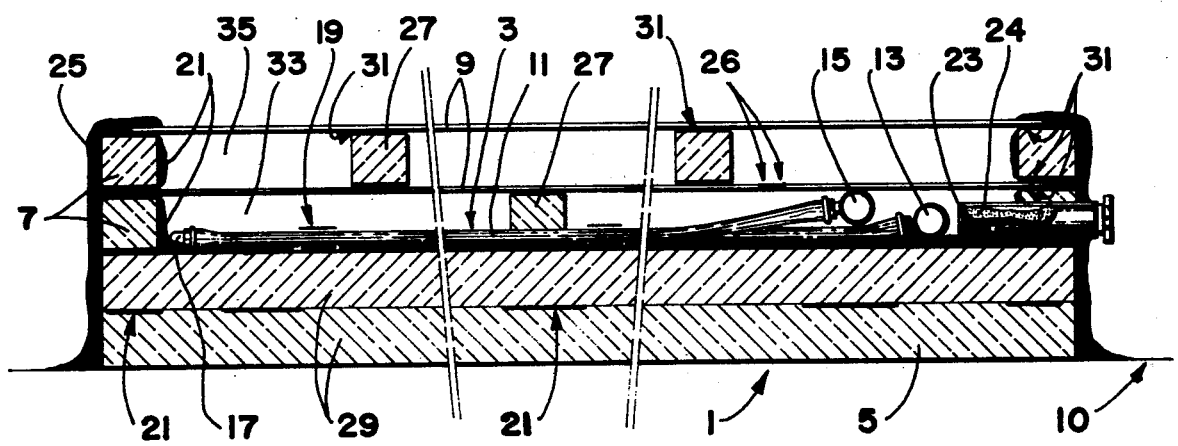
Fig-4

METHOD AND SYSTEM FOR UTILIZING A FLEXIBLE TUBING SOLAR COLLECTOR

RELATED APPLICATIONS

This application is a continuation-in-part of copending application Ser. No. 790,484, filed on Apr. 25, 1977, now abandoned, which in turn was a continuation-in-part of parent application, Ser. No. 692,887, filed June 4, 1976, and now abandoned.

SUMMARY OF THE INVENTION

It has always been thought by engineers and experts in the solar field that a highly thermally conductive absorber plate was necessary in a liquid type solar collector to transfer heat to the liquid flowing through intermittently spaced conduits. I have found to the contrary that very low thermal conductivity materials (of much lower cost) can be used providing that the liquid conduits can be greatly increased in number and spaced close together. The idea of closely spaced plastic tubing is shown in my U.S. Pat. Nos. 3,751,935 and 3,893,505 for making an ice slab for ice skating rinks; however, there is no disclosure or suggestion in those patents leading to the present solar collector invention.

By using more smaller tubes made from a material of poor thermal conductivity (than in a conventional high cost metal conduit collector) they can be extruded of a low cost flexible synthetic material capable of holding considerable static pressure, rolling up for shipment, being entirely noncorrosive, having good mechanical durability, and most importantly eliminating the expensive metal absorber plate usually made of copper or aluminum.

The base of the collector then can advantageously be formed by laying down inexpensive insulating boards capable of resisting high temperatures. This base is coated with a high temperature resistant black mastic in which the mat of black synthetic closely spaced parallel flexible tubes are laid before the mastic hardens in order to give a good thermal bond between the liquid conduits and the mastic-covered surface. For example, these base boards may be insulating boards such as three pound density fiberglass.

Alternatively the insulating board may have a conventional aluminum foil facing to which double faced adhesive tape is attached at intervals with the mat laid at right angles to the tape so that it is held in place, after which the mastic adhesive is applied between the mat tubes. This thin foil face serves the purposes of improving conductivity somewhat, preventing adhesive soaking into the insulation, providing a vapor barrier, and promoting better adhesion of the tape.

Since the assembly of the collector is to be done in the field at the job site, the insulating board base can be built up of multiple layers at the edges surrounding the tubing mat with adhesive such as roofing cement to form a perimeter or frame to which is attached a collector cover of one or more layers of translucent or transparent sheet material through which the solar radiation will travel to the tubing and mastic absorbing surface. The cover structure prevents the loss of heat to the surrounding air and wind and traps the heat inside by the well known "greenhouse effect."

The cover is preferably formed by one or more layers of a lightweight plastic sheet which is cemented to the perimeter frame and to spacer blocks by contact cement or other adhesive suitable for such materials. All of the outer surfaces of the insulating board, which may be laid directly on a roof or other built up surface,, usually inclined toward the south, are covered with roofing cement for waterproofing, vapor and air sealing, and weather resistance.

The tubing mat consists of high-temperature resistant black rubber or plastic tubes about $\frac{1}{4}$ inch diameter placed in closely spaced parallel relationship approximately 8 to 16 to the foot with maximum separation of 1 to 2 inches and not over $2\frac{1}{2}$ inches. While temperatures in the collector for house heating or water heating applications need not be over 150° F, there are occasions when the pump is not recirculating liquid through the collector with hot sunshine (high insolation) which will cause collector temperatures to rise over 200° F and sometimes over 300° F. I have found that EPDM or EPT synthetic rubber, an ethylene-propylene-terpolymer, will stand these high temperature conditions as well as the below freezing temperatures of winter and will withstand the exposure to sunshine including ultraviolet rays and ozone attack. This rubber compound is filled with carbon black and additives to increase the hardness to a durometer of between eighty and eighty-five so that it will withstand the pressures of the closed system which may reach as high as forty pounds per square inch.

Another material which may be used for this purpose is cross-linked polyethylene loaded with 20% to 40% carbon black. This material will hold pressure better than EPDM but is somewhat stiffer and more difficult to handle in making clamped joints.

Another advantage of the closely spaced tubes is that their constant up-and-down rough contour reduces the reradiation to the sky because radiation tends to be emitted normal to the emitting surface. The sloping sides of the tubing emit radiation at such angles from normal to the plane of the collector that much of the reradiated heat will not be lost because it will be reflected and absorbed within the collector. This diffusion and inclined direction of the reradiation eliminates the great expense of selective coatings as used in the prior art and which have high absorptive but low emissive quality and which are only known as expensive polished metal oxide surfaces not adaptable to flexible synthetic tubes.

Another feature of the invention is the condensation dryer which dries the air within the collector so that droplets of condensed water will not form on the underside of the cover plate. Such droplets are undesirable because they reduce the admission of solar energy. This removal of moisture is done by placing a desiccant material in pebble sized granular form, such as silica gel, in a perforated container which is connected to a tube leading outside the collector with the perforated portion of the container open to the space between the absorber tubes and the cover structure. The heating and cooling of this space in normal daytime versus nighttime operation will cause changes in density of the air in the space which will pump air out through the silica gel as it heats up in the morning and suck air back in through the desiccant material in the evening as it cools. Thus the air is dried as it enters the space in the evening by leaving its moisture in the desiccant. In the morning the hot air expelled through the desiccant picks up the moisture and carries it to the outside thus drying the desiccant ready for its next night-day cycle. The tube leading outside should be many times longer than its diameter.

The principal purpose of this invention is to achieve a low cost practical effective convenient method to install solar collector and this is done in the following ways:
1. No absorber plate is required.
2. No structural outer base enclosure is required.
3. There is less headering per square foot since mats are made as long as the available space, for example up to 125 feet in length by 4 feet in width, rather than the prior art factory modules of 6 to 10 feet in length by 2 to 4 feet in width.
4. Less headering also means less plumbing labor and materials for inerconnections to be made.
5. U-bends at one end means headering and connecting is accomplished solely at one end instead of at both.
6. Shipping costs are much lower not only because of much lighter weight materials being used, but because of the compactness of rolling up the mat and cover sheet material for shipment.
7. Handling of the lightweight collector materials can be done easily be hand, eliminating costly rigging of factory assembled collectors to rooftops.
8. Roof costs can be lower because of the lighter weight of the total assembly.
9. Engineering, architectural and contractor costs are reduced because collectors are cut at the site to suit the dimensions of the job.
10. The collectors will last for a much longer time since there is no aluminum or steel to corrode and the synthetic materials are expected to have far longer life.

There is, of course, some extra cost of the field assembly but this is easily done, as will be seen in the detailed description of a presently preferred embodiment, and is compensated for approximately by the difference in shipping costs. Moreover, there are great advantages to having the assembly done in the field by local people, which I believe will be crucial to the acceptance of solar heating and hot water by the general public, as follows:
1. The local tradesmen, artisans and contractors will fully understand the product and system.
2. They make more profit and thus will sell the system.
3. They will service the system because they understand it.
4. They will take over the encouragement and design of other jobs, and hence that vital sales ingredient, multiplication, will take place.
5. The plumbing and heating wholesalers will stock the materials as they do now for fossil fuel systems and so sales channels will be available.
6. The local building codes will be more easily changed to accept it.

A dual tubing temperature averaging effect is obtained in this solar collector for the purpose of absorbing an equal amount of solar energy in all parts of the collector. If this were not done, there would be a much higher absorption near where the liquid enters the collector and a lower absorption near the exit point, thus necessitating higher liquid flow to keep the temperature differentials lower and thus the energy absorption more even. By using the dual tube reverse-flow temperature-averaging effect, the flow rate can be much lower for a given absorption and thus the energy required for pumping can be reduced. The effects of temperature gradients in the flow direction were studied and published by Hottel and Whillier in a paper entitled "Evaluation of Flat-Plate Collector Performance" published in 1958 by the University of Arizona Press in the Transactions of the Conference on the Use of Solar Energy.

Typical temperatures in a standard high flow system might run 120° F into the collector and 123° F out where the low flow system, enabled to be achieved in an installation embodying the present invention may, for example, run 120° F in and 132° F out. For the same heat flow there is obtained a ratio of 1:4 in temperature difference and 4:1 in gallons per minute flow, in comparing a standard system to the novel system embodying the invention. The resultant savings in pumping energy for collector operation over the course of a year or, over the term of a mortgage amounts to a large dollar saving. For a 500 square foot collector suitable in many areas for a 1,000 square foot house, these comparative figures mean over 50 gallons per minute in a high flow standard system and 12.5 gpm for a low flow system embodying the invention. This pumping savings of 37.5 gpm is equal to about half a kilowatt of energy being saved.

Another major energy savings is achieved because of the low mass and weight of the system. The roll-out collector embodying the invention weighs only about one to two pounds per square foot including plastic cover, rubber absorber, and insulation base, and thus will heat up much faster than more massive conventional types with glass cover, metal absorber plate, and structural outer base.

If a heavy system takes five minutes to heat up to the point to turn on the pump after a cloud passes, and a light system takes only two minutes, three minutes will have been gained. If a second cloud comes along five minutes after the first one left, the pump of the heavy system may not go on at all. It can be seen that a condition may occur where a heavy system may collect almost nothing during passage of intermittent clouds and a light system may collect over fifty per cent. Thus, since partly cloudy weather is so common in most areas, a light collector system will have far higher overall effectiveness than a heavy one.

BRIEF DESCRIPTION OF THE DRAWINGS

FIGS. 2A and 2B are enlargements of portions of FIG. 2.

FIGS. 3 and 4 are cross-sectional views of alternate forms of the subject solar collector; FIG. 3 being a section taken across the mat, and FIG. 4 lengthwise of the mat. FIG. 3A is an enlargement of a portion of FIG. 3.

DESCRIPTION OF A PREFERRED EMBODIMENT

Figure 1:
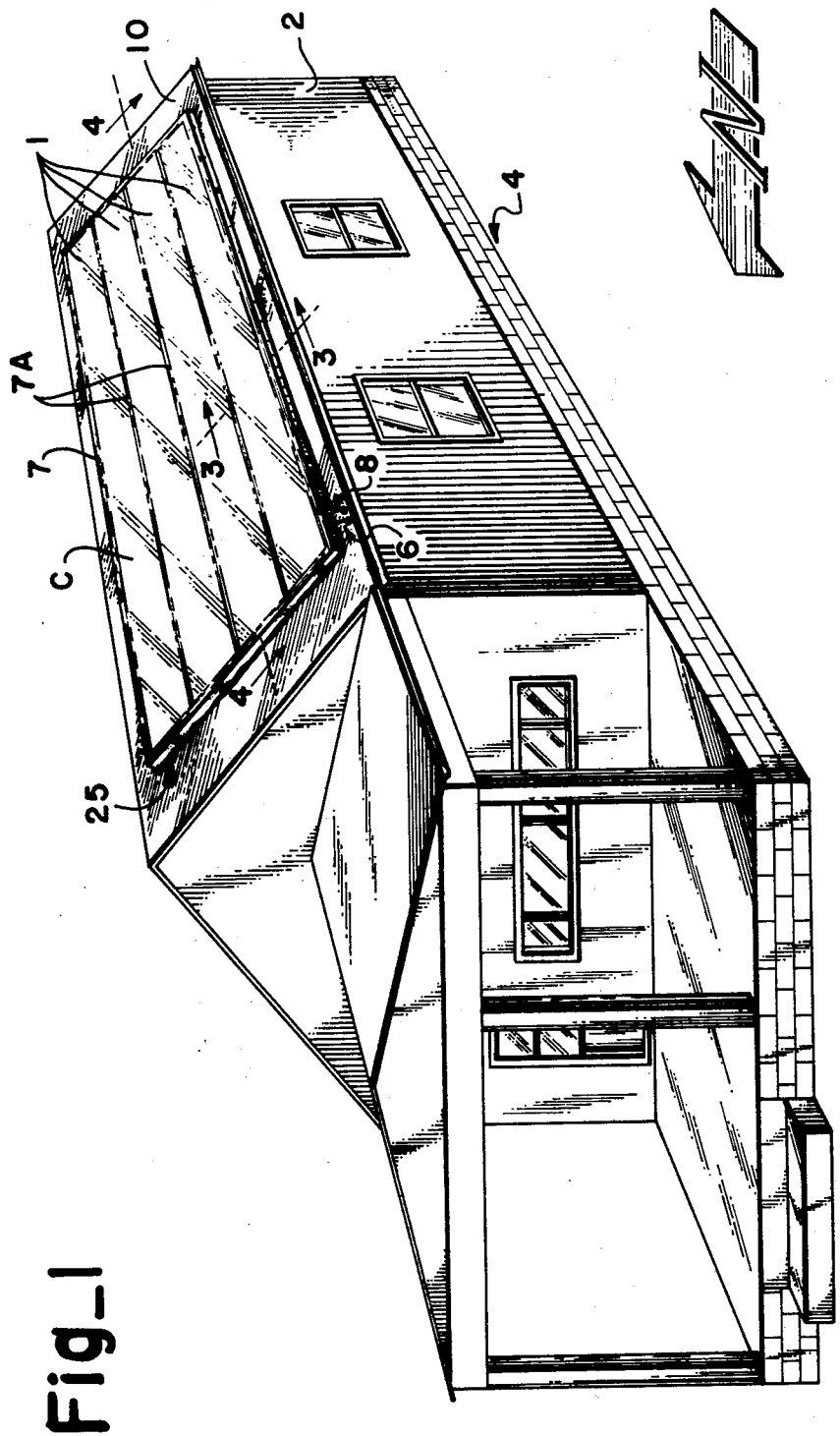
FIG. 1 is a perspective view of a one-story building with field assembled roll-out solar collectors mounted on a south facing sloping roof.

In FIG. 1 a typical small house or small commercial building 2 with a south facing sloping roof 10 is shown with four rollout solar collectors 1 mounted flush on the sloping roof 10 to form the whole solar collector C. Built up insulation borders 7 are shown surrounding the collectors 1 covered with waterproof roofing cement 25 which joins them tight to the roof surface and prevents rain or moisture penetration.

These collectors are shipped in rolls and cut to length to fit the available roof space in the longest direction with plumbing connections of supply 6 and return 8 piping at one end entering the roof and leading to other components located in basement 4. Alternatively due to the light weight, it is practical to ship in larger factory-made panels such as 4 feet × 15 feet, 4 feet × 20 feet, or even 4 feet × 25 feet or more.

Figure 2:
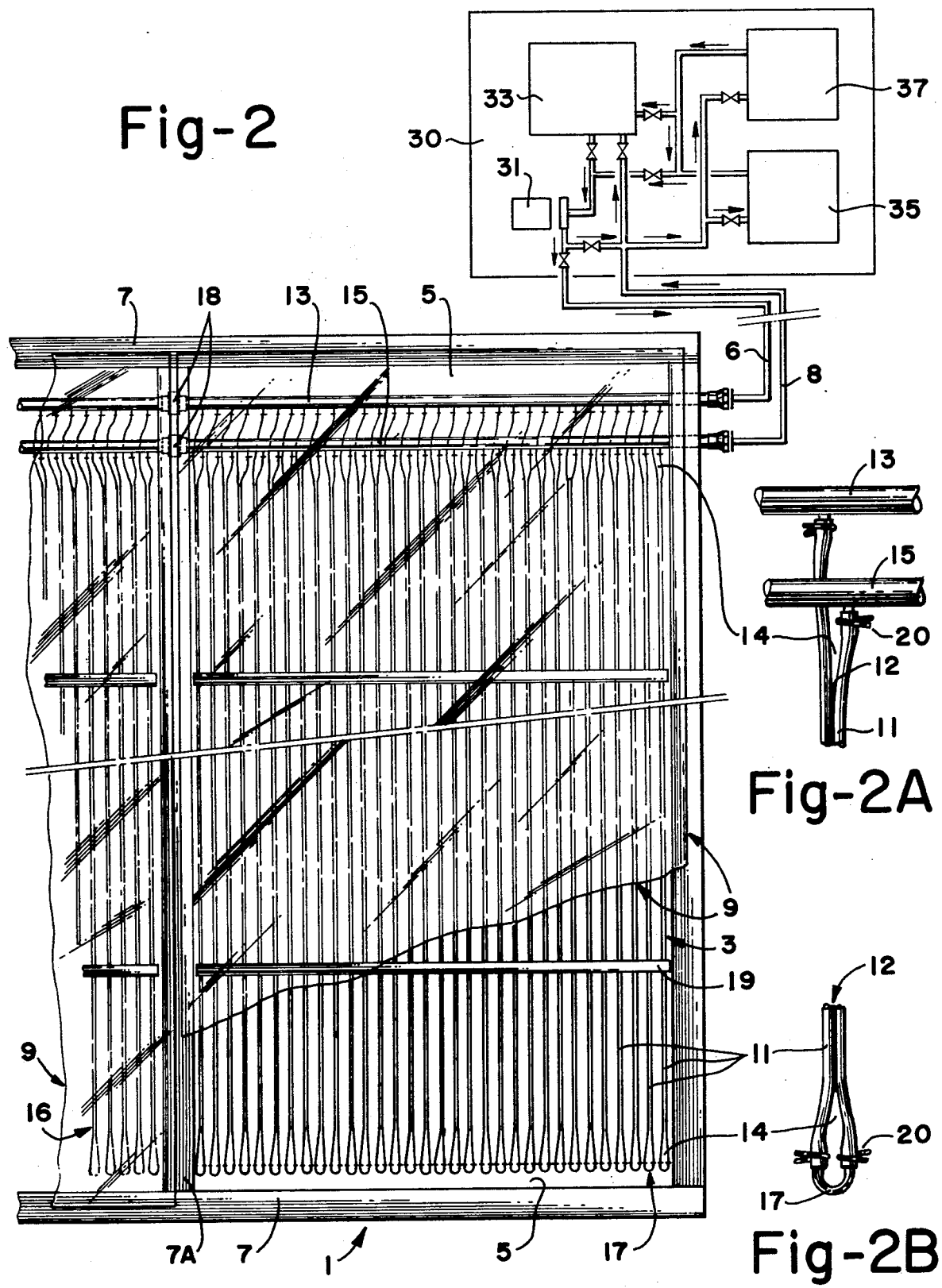
FIG. 2 is a schematic view of the liquid recirculating flow arrangement of one of the subject collectors and shows the pumping, storage and heat utilizing devices used in providing heating and hot water for the building.

A plan view of the solar collector 1 is shown in FIG. 2. The rollout flexible absorber mat 3 consists of 32 parallel lengths of pairs of twin extruded tubing 11, each pair connected by a thin tear strip 12 (see FIG. 3 and 3A) so that each half of the pair may be separated as shown at 14 (FIGS. 2, 2A and 2B) for ease of making joints at one end to copper U-bends 17 and at the other end to copper headers 13 and 15.

The mat 3 is laid out on insulation base 5 and is surrounded by a perimeter or border 7 build up of the same insulation board material such as 3 or 6 pound density fiberglass board one or two inches thick. A transparent or translucent sheet of cover material 9, preferably a glass fiber reinforced flexible plastic sheet, for example clear polyester resin 0.025 inch thick, spans from one insulation border 7 to the other to prevent heat loss to the atmosphere.

The pairs of twin tubing elements are connected to each other at one end by U-bend elements 17 (FIGS. 2 and 2B). At the other end a supply header 13, (FIG. 2A) and return header 15 are connected respectively to each half of the tubing pairs 11. When more than one collector 1 is used in a parallel location, subheaders 13 and 15 may be connected directly by unions 18 to similar headers in the adjoining mat 16 through holes cut in partition border 7A.

Supply pipe 6 and return pipe 8 connect the collector 11 with utility room 30 often located in the basement. Pump 31 recirculates liquid through the collector and through heat storage reservoir 33, hot water heater 35 and building heater 37 depending upon demand of each by a network of piping, control valves and temperature sensing devices which will not be described here. The recirculating liquid may be water, but in colder climates anti-freeze solutions, such as a forty per cent by weight mixture of ethylene glycol with water, may be used to prevent freezing.

FIGS. 2A and 2B show enlarged views of how the absorber mat tubing 11 is connected to the supply 13 and return 15 headers and U-bends 17. In each case the two halves of the dual tubing 11 are split apart by a ripping motion to give the separation 14. The tubing is sized to provide adequate liquid flow to carry the heat away efficiently, yet not so large as to be inherently bulky and expensive. I have found that a minimum inside diameter of 0.125 inches and a maximum of 0.375 inches cover the range of the present invention to satisfy these stated limitations. The tubes in this example have an inside diameter of about 0.200 inches and are stretched by pushing them over the 0.250 inch outside diameter copper tubing to give a very tight seal due to the elastic quality of the rubber tubing. Wire spring clamps 20 are used for extra tightness and two barbed grooves are machined in each copper insert to give a gripping action particularly under elevated pressure. A preferred clamp is a flanged eyelet 22 which is pulled over the enlarged rubber tube to give a broader and more uniform grip than a spring clamp can do. This prevents grooving the tubing if the EPDM softens under an extreme temperature condition.

FIG. 3 shows a cross-sectional view of the solar collector 1 taken crosswise of the absorber mat with a single layer cover 9 which may be any translucent or transparent glass or plastic but preferably is a flexible reinforced plastic, which may be shipped in long rolls four feet wide.

The base 5 of each collector 1 is a layer of light weight insulation boards capable of withstanding temperatures up to 400° Fahrenheit without swelling, decompositing, or giving off gases. Such a board material is three pound per cubic foot density fiberglass board which has been heated to 450° to drive off any binder gases. If these gases are not driven off before use, they may tend to cloud the collector covers 9 if very high temperature conditions are encountered in use, such as if a leak would cause the collector to go dry on a clear hot summer day. The insulation base 5 should be at least one inch thick which is sufficient if the collector 1 is set on a roof. Multiple layers of insulation board 29 may be used to make the base 5 as shown in FIG. 4 if needed, such as when the collectors are mounted on selfstanding panels with outdoor air in contact with the undersurface of the base 5.

The base 5 of the solar collector is shown layed directly on roofing materials consisting of shingles and roofing paper 37 and plywood 39.

The insulation base 5 is then covered with a black mastic 21 such as roofing cement without asbestos filler or preferably a rubber-based black mastic adhesive such as 3M Company's no. 321 cement or Uniroyal's no M5038 adhesive capable of withstanding 400° F or more. The layer should be applied approximately 3/16 inch thick in order to completely seal the insulation from passage of moisture or gases and to give a heat transfer medium between the tubes 11 of the mat 3. Heat conductive fillers such as aluminum flake may be used to improve the heat transfer of the mastic 21, but the heat transfer at the surface of the tubes is more important than the conductivity of the mastic itself. Thus, it has been found that good continuous adhesive bonding between mastic and tubing is most important since the tubes are so numerous and close together that low thermal conductivity of the mastic itself is more than made up for. It is important that cracks or separations between the mastic and tubing surface be avoided.

Perimeter insulation borders 7 and divider blocks or partitions 7A are then cut out of the same insulation board material and are cemented by the mastic both around the outside of the whole collector C and between the respective collector mats 3, which are spaced 4 feet on centers. Each mat 3 is somewhat less than 4 feet wide.

The next step is the rolling out and placing of the flexible absorber mat 3 into good contact with the undried black mastic 21 on all areas. When the tubing of each mat 3 is pressed into the mastic, the mastic will squeeze up between the tubes to ¼ inch thickness. An alternate method is to tape the mat to a foil-faced insulation board and spray, brush, roll or trowel the cement or adhesive on top of and through the mat, covering all of the aluminum foil and making good fillet contact with the tubing walls. Then a few spacer blocks 27 of insulation board are adhered to the mastic to give support for the cover in midspan. The headers are connected by cutting channels through the perimeter 7 and partitions 7A and then sealing the gaps around the headers with mastic.

Next, the collector cover 9 is rolled out and adhered with contact cement 31 to the perimeter 7, partition 7A and spacer blocks 27. The final major step is sealing the outside of the whole collector C to the roof 10 or other mounting surface with a heavy coating of black roofing cement 25 to seal all areas tight from rain or moisture.

In order to prevent condensation on the inner surface of the cover a dryer tube 23 with numerous air openings at the collector end filled with silica gel particles 24 is located inside the collector and connected to the outside air through a tube many times longer than its diameter. The space around the tube is sealed to the perimeter 7 with mastic. As described previously when the sun sets or clouds come, the air inside the space 33 contracts pulling in outdoor air over the silica gel particles and drying the air leaving moisture in the particles. When the sun comes out, the internal air expands and pushes out throught the tube, picking up the moisture and expelling it outdoors. These particles are therefore constantly rejuvenated during each contraction-expansion cycle and do not need replacement.

FIG. 4 shows a longitudinal section taken through collector mat showing spacer strips 19 which hold and retain the 32 dual mat tubes 11 in closely spaced parallel relation to each other for handling. Since these strips are not needed after the mat is adhered to the mastic, they may be made of lower temperature materials such as polyvinyl chloride which is excellent for its heat sealing ability. Two flexible spacer strips are used, one flexible strip is positioned above the tubes and one rigid strip is below the tubes. They are heat sealed together in the spaces between the dual tubes 11 by having the flexible strip above stretched down into contact with the rigid strip below in a multiple heat sealing machine.

FIG. 4 shows double glazings of the collector cover 9 which may be required for solar heating and hot water generation in colder climates. The upper glazing is applied just like the first with additional perimeter, partition and spacer blocks. A few breather holes 26 in the inside glazing are desired so the air dried by the dryer 23 can distribute into the spaces 33 and 35 below the respective glazings.

Figure 5:
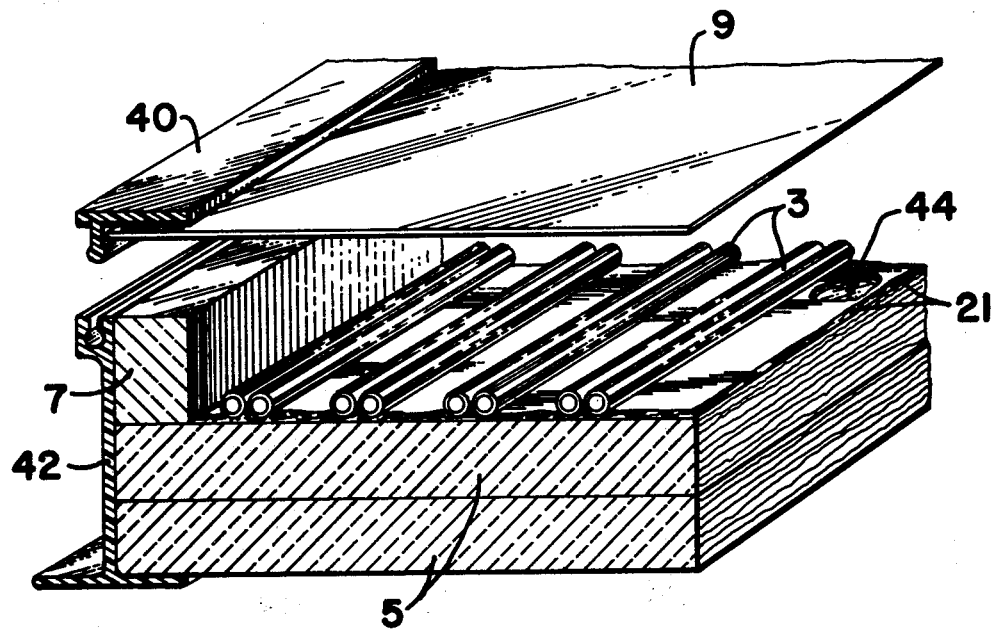
FIG. 5 is similar to FIG. 4 but shows a mounting strip around the perimeter outside the insulation.

FIG. 5 shows a perimeter mounting strip made in two plastic extrusion pieces which snap together. The cover plate 9 is attached to the upper piece 40 and the insulation 5 and absorber mat 3 to the base strip 42. This provides easy access for maintenance, better appearance, and a stronger bond for mounting purposes. An aluminum foil layer 44 is shown under mat 3 and mastic adhesive 21 for reasons previously described.

Figure 6:
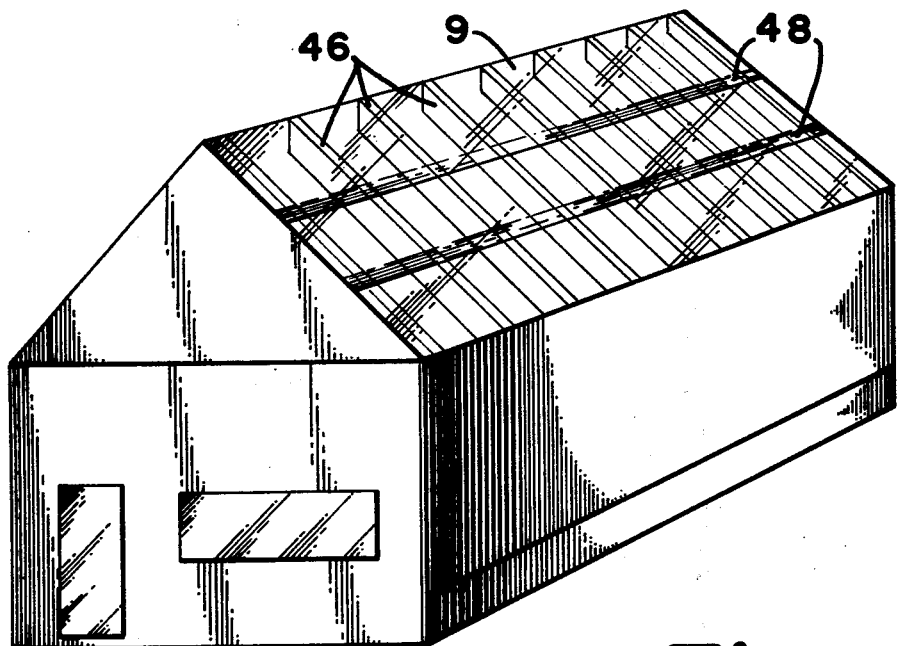
FIG. 6 is a perspective view of a solar heated building using solar materials in place of roofing.

FIG. 6 is similar to FIG. 1 except that the flexible translucent cover sheet 9, with tradenames such as "Kalwall", "Lexan", or "Filon", is fastened by nails 50 and adhesive 52 (see FIG. 8) to the open roof rafters 46 across them at right angles and overlapped 48 in a manner similar to shingling.

Figure 7:
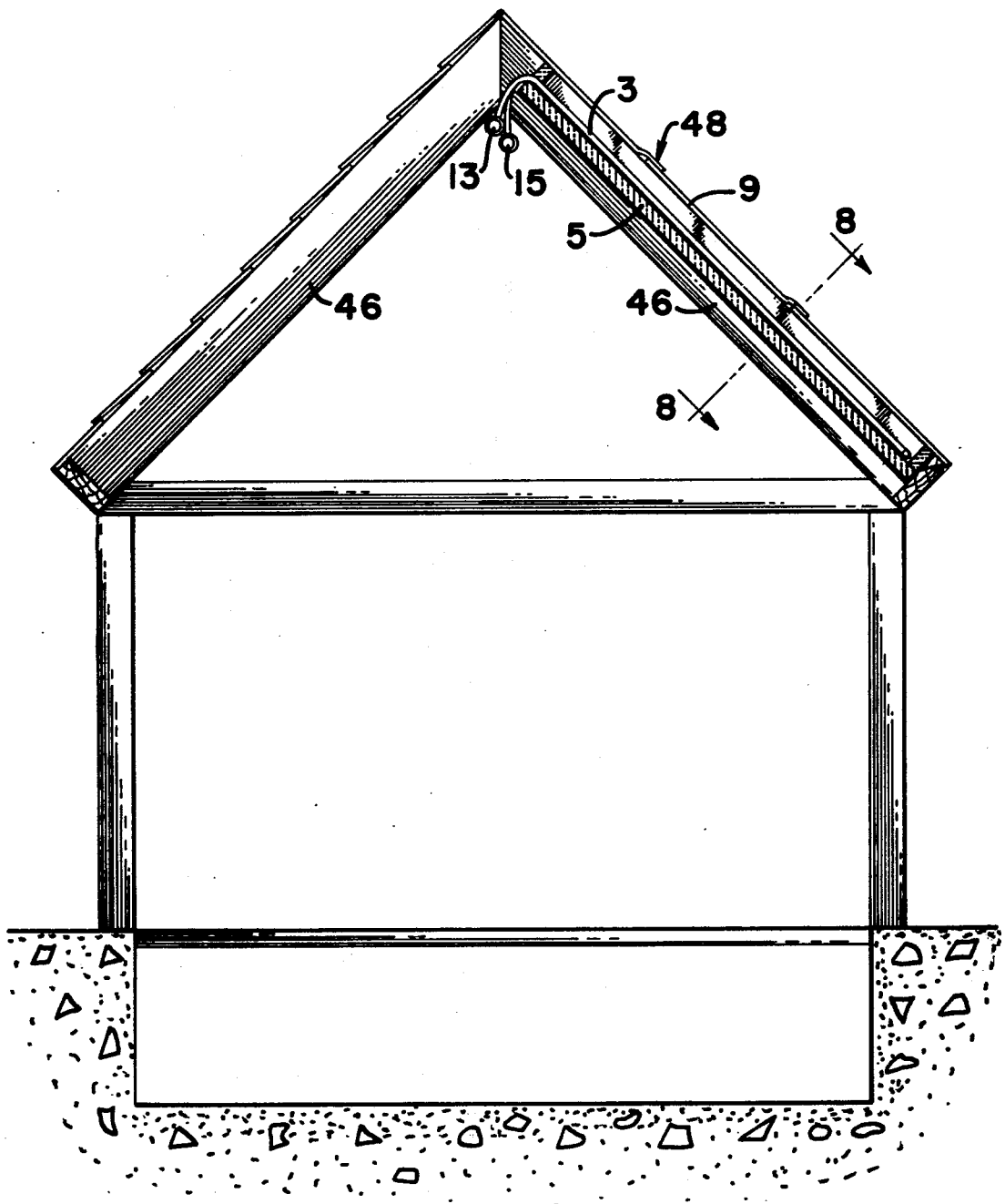
FIG. 7 is a cross-sectional elevational view of the roofing method of FIG. 6.

FIG. 7 shows in cross-section the insulation board 5 with the mat of black snythetic tubing 3 pushed up between the rafters 46 from the inside under cover sheets 9 with mat tubing at the upper end curving down so headers 13, 15, may be connected to other headers for the full length of the roof.

Figure 8:
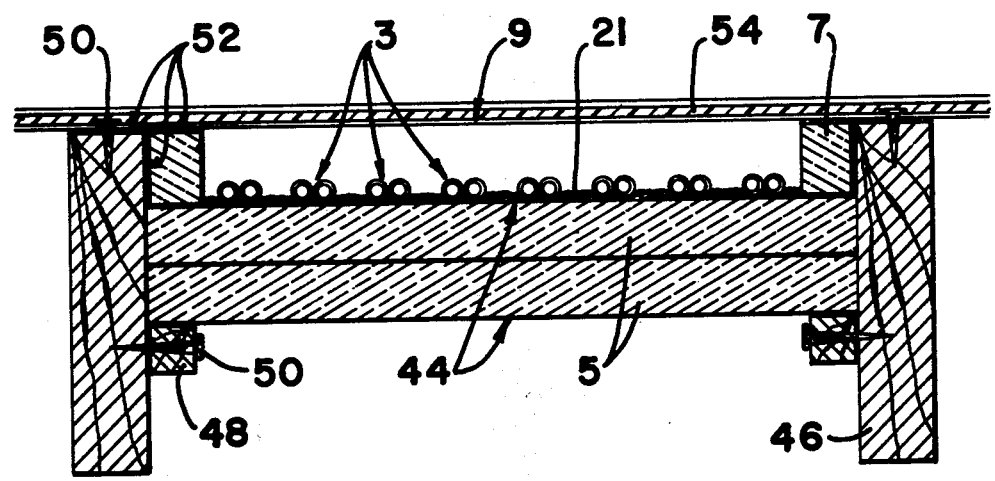
FIG. 8 is a cross-sectional view along the down-sloping roof rafters showing the collector installation.

FIG. 8 (see arrows showing cross-sectional location on FIG. 7) shows the space between the rafters with the translucent cover sheet 9 in place, perimeter insulation strips 7 bonded to the rafters 46 and cover sheet 9, and insulation board 5 with tubing mat 3 and mastic adhesive 21 pushed up between the rafters 46. The collector base may be held in place by nailed wooden cleats 48 which may be removed for lowering the collector base for service or inspection.

This method of installing a solar collector is far less expensive because it substitutes for normal roofing and insulation, because the work can be done from inside eliminating scaffolding and weather problems, and because piping does not go through roof and need not be insulated. Part of the area can be used for heating and part for hot water, since the temperature requirements are often different.

The same construction method may also be done in vertical walls facing generally toward the south.

A flexible bonding strip 54 shown in FIG. 8 is necessary to join overlapping pieces of translucent cover sheeting which are subject to thermal expansion and must be sealed to prevent air openings where solar heat would escape. Thermal expansion in the lateral direction will cause slight bowing of the cover sheet between the rafters or studs to which it is attached.

Referring back to the poor thermal conductivity of the mastic and the rubber tube walls, Professor W. A. Beckman of the University of Wisconsin in his paper "The Hottel, Whillier, Bliss Collector Model" given at the National Science Foundation Workshop on Solar Collectors, November 21–23, 1974 pages 322 to 326 of the Proceedings, shows in FIG. 5, page 326 that if tube spacing is not over 1 inch (2.5 centimeters) the collector efficiency factor is not affected by the product of absorber thickness and conductivity varying by a 80 to 1 ratio. In this illustrative embodiment I use an average mastic thickness of $\frac{1}{4}$ inches compared to an aluminum absorber plate of 0.040 inch, a ratio of 6.25 to 1 on thickness. Aluminum has a thermal conductivity of 118 Btu/hr.sq. ft. ° F/ft. and the mastic has a conductivity of 0.25, a ratio of 472 to 1. Thus the ratio of the product of conductivity and thickness is 472/6.25 or 75, which is within the 80 to 1 range of the reference cited.

The mastic may, moreover, be mixed with aluminum powder or other heat conductive flakes, powder, chips, particles or filaments to increase the thermal conducitivity of the mastic by many fold. Also, other materials such as "Thermon" heat transfer cement painted black, or mixed with carbon black, may be used.

As an alternate design the collectors may be laid in a horizontal plane upon a flat roof and reflectors may be used to angle the low winter sun onto the collectors. Or another variation is that water be used even in cold climates and be allowed to freeze on winter nights in the rubber tubes which will not damage due to their elasticity. Freezing does not hurt the U-bends since, being copper with faster transfer of heat from the water, ice will form in them first and squeeze water out into the rubber tubes. The headers are protected by inserting a single tubing piece of the EPDM tubing inside the header tube. The inner flexible tube is sealed at each end trapping air inside and providing a cushion that absorbes the expansion of the ice. If on a small area collector, such as a domestic water heater, a pump is allowed to run continuously, freezing will be rare even in very cold weather. Interconnections through partitions 7A and connections to and from the piping to the building are advantageously made of EPDM large size tubing or hose to absorb freezing expansion.

Inviting attention again to FIG. 5, it is seen that the base mounting strip 42 has an inverted T-shaped configuration, with opposed flanges 57 and 58 extending along opposite sides at the bottom of a vertical web 59. These opposed flanges 57 and 58 act as a mounting base for the strip 42 with the vertical web 59 positioned flush against the perimeter of the collector and its insulation border 7. The inner flange 57 projects beneath and supports the insulation base 5. The outer flange 58 may serve as a convenient attachment member for mounting the collector on a roof surface by driving nails or screws through holes drilled in this flange. Also, if desired, roof flashing can be installed to overlap this mounting flange 58. To increase the insulation effect of the light-weight insulation boards 5, a layer of aluminum foil 44 is shown adhered to the undersurface of the insulation base.

Extending along the top of the vertical web 59 are a pair of stiffly resilient parallel lips 60 which define a groove 61 into which can be pressed a depending lip 62 of the upper strip 40. This lip 62 has an enlarged bead running along its lower edge, and the bottom of the groove 61 is enlarged slightly as seen in FIG. 5 for receiving this bead in a snap fit. Thus, a firm manual pressure exerted down upon the upper strip 40 will cause its lip 62 to snap down into the groove 61 for tightly but removably retaining the cover 9 in place.

There is an inwardly projecting flange 64 on the upper strip 40 which overlies the cover 9 and may be adhered to the cover by a flexible bonding 66. The cover 9 including its perimeter mounting strip 40 may be made sufficiently flexible that the whole cover can be rolled up, if desired for shipment, into a roll approximately 4 to 5 feet in diameter, depending upon the overall length of the cover.

Referring back to the temperature levels to which the black synthetic tubing 11 may be subjected under hot sunshine (high insolation), its temperature may even rise to approximately 400° F. This elevated temperature of the tubing 11 can occur, for example, when a collector with a double-glazed cover is newly installed and is exposed to high insolation prior to the time that the piping connectors to the circulation system have been made so that the solar-heated tubing itself does not yet contain the intended liquids. The flexible synthetic materials described above containing carbon black will withstand sustained periods of solar heating up to temperature levels of approximately 400° F without damage. In summary, these flexible synthetic materials containing carbon black are ethylene-propylene-terpolymer, EPT synthetic rubber, ethylene-propylene-dieneterpolymer, EPDM, and cross-linked polyethylene.

In each of the various embodiments of the solar collector described above, the preferred inside diameter of the tubes 11 is in the range from ⅛th of an inch to ⅜ths of an inch. The preferred average center-to-center spacing of each successive tube 11 across the width of the grid pattern is in the range from one-half of an inch to one and one-half inches.

Although specific embodiments of the present invention have been disclosed in detail above, it is to be understood that these are only for pusposes of illustration. This disclosure of a method and system for collecting heat from the sun with great savings of material and labor should not be construed as limiting the scope of the invention, since modifications may be made to the described method and structure by those skilled in the art in order to adapt this invention to particular applications, without departing from the invention as defined by the following claims.

I claim:

1. The method of transferring heat from the radiant energy of the sun to a recirculating liquid system comprising the steps of:
   a. laying lightweight insulating material on a surface receiving heat from the sun,
   b. covering the exposed surface of said insulating material with a coating of mastic adhesive,
   c. laying in the mastic coating a mat consisting of multiple lengths of closely-spaced, parallel black flexible synthetic tubing members running lengthwise in a grid pattern by securing means so that the mat length is many times greater than its width,
   d. connecting adjacent pairs of first ends of said tubing members to each other at one end of said mat by means of U-shaped conduit pieces,
   e. providing supply and return headers extending across the other end of said mat and connecting said supply and return headers alternately to the second ends of said tubing members with the direction of flow of the circulating liquid being opposite in neighboring tubing members in the mat,
   f. forming a raised perimeter of insulating material enclosing said mat on all four sides,
   g. attaching a cover sheet of translucent solar energy transmitting material to said raised perimeter for creating an enclosed air space above said mat,
   h. covering the exposed surfaces of the perimeter insulating material with watertight adhesive,
   i. providing pipes leading to and from a recirculating pumped heat utilizing system and
   j. connecting the supply and return headers to the supply and return pipes.

2. The method of transferring heat from the radiant energy of the sun to a recirculating liquid system as claimed in claim 1 in which anti-freeze material is mixed with the recirculating liquid to prevent freezing in cold weather.

3. The method of transferring heat from the radiant energy of the sun to a recirculating liquid system as claimed in claim 1 in which the inside diameter of said tubing members is between one-eighth and three eighths of an inch.

4. The method of transferring heat from the radiant energy of the sun to a recirculating liquid system as claimed in claim 1 including the step of locating a tube containing a desiccant material with one end of said tube communicating with the outside and the other end communicating with the air space between said mat and said cover sheet.

5. The method of transferring heat from the radiant energy of the sun to a recirculating liquid system as claimed in claim 1 in which the cover sheet is made of flexible reinforced plastic.

6. A system for transferring heat from the radiant energy of the sun to a recirculating liquid comprising:
   a. a layer of lightweight insulating material placed on a surface receiving heat from the sun,
   b. a coating of mastic adhesive covering the exposed surface of said insulating material, c. a mat placed in the mastic coating consisting of multiple lengths of closely spaced black flexible synthetic tubing members running lengythwise held in a grid pattern by securing means so that the mat length is many times greater than its width, d. adjacent pairs of said tubing members being connected to each other at one end of said mat by means of U-shaped conduit pieces, e. supply and return headers extending across the other end of said mat being connected to the ends of said tubing members alternately with the direction of flow of the circulating liquid being opposite in neighoring tubing members in the mat, f. a raised perimeter formed of insulating material enclosing said mat on all four sides, g. a cover sheet of translucent solar transmitting material attached to said raised perimeter so as to create an enclosed air space above said mat, h. the exposed surfaces of all insulating material being covered with watertight material, i. pipes being provided leading to and from a recirculating pumped heat utilizing system, and j. supply and return headers being connected to said pipes.

7. A system for transferring heat from the radiant energy of the sun to a recirculating liquid as claimed in claim 6 in which anti-freeze material is mixed with the recirculating liquid to prevent freezing in cold weather.

8. A system for transferring heat from the radiant energy of the sun to a recirculating liquid as claimed in claim 6 in which the inside diameter of said tubing member is between one-eighth and three-eighths of an inch.

9. A system for transferring heat from the radiant energy of the sun to a recirculating liquid as claimed in claim 6 in which a tube containing a desiccant material is located with one end of said tube communicating with the outside and the other end communicating with the air space between said mat and said cover sheet.

10. A system for transferring heat from the radiant energy of the sun to a recirculating liquid as claimed in claim 6 in which the cover sheet is made of flexible reinforced plastic.

11. The method of transferring heat from the radiant energy of the sun to a recirculating liquid system comprising the steps of:

a. laying lightweight insulating material on a surface receiving heat from the sun, b. placing on said insulating material a mat consisting of multiple lengths of closely-spaced, parallel black flexible synthetic tubing members running lengthwise held in a grid pattern by securing means so that the mat length is greater than its width, c. connecting adjacent pairs of first ends of said tubing members to each other at one end of said mat by means of U-spaced conduit pieces, d. providing supplying and return headers extending across the other end of said mat and connecting said supply and return headers alternately to the second ends of said tubing members with the direction of flow of the circulating liquid being opposite in neighboring tubing members in the mat, e. forming a raised perimeter of insulating material enclosing said mat on all four sides, f. covering the exposed surface of said insulating material with a coating of mastic adhesive and bonding it to said mat, g. covering the mat and perimeter insulation with a sheet of translucent solar energy transmitting material for creating an enclosed air space above said mat, h. covering the outer edges of said perimeter insulating material and translucent sheet with water protecting means, i. providing pipes leading to and from a recirculating pumped heat utilizing system and j. connecting the supply and return headers to the supply and return pipes.

12. The method of transferring heat from the radiant energy of the sun to a recirculating liquid system as claimed in claim 11 in which the lightweight insulating material has an upper surface of aluminum foil.

13. The method of transferring heat from the radiant energy of the sun to a recirculating liquid system as claimed in claim 11 in which the translucent sheet is connected to a waterproof extruded strip surrounding the outer edges of said perimeter insulating material.

14. A system for transferring heat from the radiant energy of the sun to a recirculating liquid comprising:

a. a layer of lightweight insulating material placed on a surface receiving heat from the sun, b. a mat placed on said layer consisting of multiple lengths of closely spaced black flexible synthetic tubing members running lengthwise held in a grid pattern by securing means so that the mat length is greater than its width, c. adjacent pairs of said tubing members being connected to each other at one end of said mat by means of U-shaped conduit pieces, d. supply and return headers extending across the other end of said mat being connected to the ends of said tubing members alternately with the direction of flow of the circulating liquid being opposite in neighboring tubing members in the mat, e. a raised perimeter formed of insulating material enclosing said mat on all four sides, f. a coating of mastic adhesive covering the exposed surface of said insulating material and bonding it to said mat, g. a sheet of translucent solar energy transmitting material covering the mat and perimeter insulation so as to create an enclosed air space above said mat, h. outer edges of said perimeter insulating material and translucent sheet being covered with water protecting means, i. pipes being provided leading to and from a recirculating pumped heat utilizing system, and j. supply and return headers being connected to said pipes.

15. A system for transferring heat from the radiant energy of the sun to a recirculating liquid as claimed in claim 14 in which the lightweight insulating material has an upper surface of aluminum foil.

16. A system for transferring heat from the radiant energy of the sun to a recirculating liquid as claimed in claim 14 in which the translucent sheet is connected to a waterproof extruded strip surrounding the outer edges of said perimeter insulating material.

17. A system for transferring heat from the radiant energy of the sun to a recirculating liquid as claimed in claim 14 in which the supply and return headers at one end of said mat have inside them a resilient synthetic member to prevent damage by absorbing the expansion of water to ice when freezing.

18. The method of transferring heat from the radiant energy of the sun to a recirculating liquid system comprising the steps of:

a. Attaching a series of long sheets of translucent solar energy transmitting material across the spaced apart structural members of a roof in overlapping manner to form a watertight roof enclosure,
b. forming lightweight insulating material to fit the space between said structural members,
c. placing on said insulating material a mat consisting of multiple lengths of closely-spaced, parallel black flexible synthetic tubing members running lengthwise held in a grid pattern by securing means so that the mat length is greater than its width,
d. connecting adjacent pairs of first ends of said tubing members to each other at one end of said mat by means of U-shaped conduit pieces,
e. providing supply and return headers extending across the other end of said mat and connecting said supply and return headers alternately to the second ends of said tubing members with the direction of flow of the circulating liquid being opposite in neighboring tubing members in the mat,
f. covering the exposed surface of said insulating material with a coating of mastic adhesive and bonding it to said mat,
g. placing said insulating material, tubing mat, and mastic adhesive between said structural members so as to form an insulated air space between mat and translucent sheets,
h. providing pipes leading to and from a recirculating pumped heat utilizing system and
i. connecting the supply and return headers to the supply and return pipes.

19. The method of transferring heat from the radiant energy of the sun to a recirculating liquid system comprising the steps of:
a. Attaching a series of long sheets of translucent solar energy transmitting material across the spaced apart structural members of a sidewall of a structure in overlapping manner to form a watertight enclosure,
b. forming lightweight insulating material to fit the space between said structural members,
c. placing on said insulating material a mat consisting of multiple lengths of closely-spaced, parallel black flexible synthetic tubing members running lengthwise held in a grid pattern by securing means so that the mat length is greater than its width,
d. connecting adjacent pairs of first ends of said tubing members to each other at one end of said mat by means of U-shaped conduit pieces,
e. providing supply and return headers extending across the other end of said mat and connecting said supply and return headers alternately to the second ends of said tubing members with the direction of flow of the circulating liquid being opposite in neighboring tubing members in the mat,
f. covering the exposed surface of said insulating material with a coating of mastic adhesive and bonding it to said mat,
g. placing said insulating material, tubing mat, and mastic adhesive between said structural members so as to form an insulated air space between mat and transluecent sheets,
h. providing pipes leading to and from a recirculating pumped heat utilizing system and
i. connecting the supply and return headers to the supply and return pipes.

20. The method of transferring heat from the radiant energy of the sun to a recirculating liquid system comprising the steps of:
a. placing on lightweight insulating board capable of withstanding 300° F and laminated with aluminum foil a mat of flexible tubes made of a material capable of withstanding 300° F and containing carbon black,
b. applying a black mastic adhesive to the surface of the aluminum foil and the flexible tubes of said mat,
c. connecting supply and return headers to said flexible tubes,
d. covering the air space over said mat of flexible tubes with a transluecent sheet of plastic material capable of withstanding 200° F.
e. enclosing the perimeter of said insulating board and translucent sheet with insulation material protected by waterproofing means,
f. providing pipes leading to and from a recirculating pumped heat utilizing system, and
g. connecting the supply and return headers to the supply and return pipes.

21. The method of transferring heat from the radian energy of the sun to a recirculating liquid system according to claim 20, wherein the inside diameter of the tubing is between ⅛ inch and ½ inch.

22. A heat absorbing mat for tansferring heat from the radiant energy of the sun to a circulating liquid comprising:
a. a flexible mat structure adapted to be placed upon a supporting surface positioned in a direction facing toward the sun,
b. said mat including multiple lengths of closely spaced black flexible synthetic tubing members running lengthwise held in a grid pattern,
c. securing means for holding said tubing members extending generally parallel one to another lengthwise of the mat structure so that the mat length is greater than its width,
d. adjacent pairs of said tubing members being connected to each other at one end of said mat through U-shaped bends,
e. supply and return headers extending across the other end of said mat and being connected to the ends of said tubing members alternately with the direction of flow of the circulating liquid being opposite in neighboring tubing members in the mat,
f. said tubing members having an inside diameter of between ⅛ inch and ⅜ inch,
g. said tubing members having a maximum separation of 2 inches,
h. said synthetic tubing members being made of flexible synthetic material containing carbon black capable of being rolled up for shipment and being capable of withstanding temperatures over 300° F caused by exposure to hot sunshine in the absence of liquid flow,
i. said headers having connections adapted for connection to supply and return pipes for providing circulating liquid flow to a heat utilization system.

23. A heat-absorbing mat as claimed in claim 22, in which:
said synthetic tubing members are made of flexible synthetic material containing carbon black and selected from the group consisting of ethylene-propylene-terpolymer, EPT synthetic rubber, ethylene-propylene-diene-terpolymer, EPDM, and cross-linked polyethylene.

24. A heat-absorbing mat for transferring heat from the radiant energy of the sun to a circulating liquid comprising:
   a. a flexible mat structure adapted to be placed upon a supporting surface positioned in a direction facing toward the sun,
   b. said mat including multiple lengths of closely spaced black flexible synthetic tubing members running lengthwise held in a grid pattern,
   c. securing means for holding said tubing members extending generally parallel one to another lengthwise of said mat structure so that the mat length is greater than its width,
   d. supply and return headers extending across said mat and being connected to the ends of said tubing members for providing flow of the circulating liquid through the tubing members in the mat,
   e. said tubing members having an inside diameter of between ⅛ inch and ⅜ inch,
   f. said tubing members having a maximum separation of 2 inches,
   g. said synthetic tubing members being made of flexible synthetic material containing carbon black and being capable of withstanding temperatures over 300° F when exposed to hot sunshine in the absence of liquid flow,
   h. said flexible synthetic material having elasticity to avoid damage if the liquid in said tubing members is allowed to freeze on winter nights, and
   i. said headers having connections adapted for connection to supply and return pipes for providing circulating liquid flow to a heat utilization system.

25. A solar collector for transferring heat from the radiant energy of the sun to a circulating liquid comprising:
   a. a layer of lightweight insulating material forming the insulation base of said collector,
   b. a raised border formed of insulating material extending around the perimeter of said base for surrounding said collector,
   c. a cover sheet of solar energy transmitting material extending across the collector between said raised border so as to create an enclosed air space within said border and above said insulation base,
   d. a plastic extrusion base mounting strip extending around the perimeter of said insulation base,
   e. an upper mounting strip extending around said sheet and positioned above said base mounting strip adapted for snap fit engagement with said base mounting strip for removably holding said cover sheet onto said solar collector for providing easy access into said enclosed air space,
   f. a multiplicity of closely spaced black flexible tubes running lengthwise of said enclosed air space in a grid pattern,
   g. securing means for holding said flexible tubes extending in a grid pattern on said insulating base with the average center-to-center spacing of the tubes across the grid pattern in the range from one-half of an inch to one and one-half inches,
   h. supply and return headers extending across said enclosed air space and being connected to the ends of said tubes for providing flow of the circulating liquid through the tube,
   i. said headers having connections adapted for connection to supply and return the supply and return pipes for circulating liquid flow to a heat utiliation system, and
   j. said tubes being formed of flexible synthetic material capable of withstanding temperatures over 300° F caused by exposure to hot sunshine in the absence of liquid flow.

26. A solar collector as claimed in claim 25, in which:
   a. said plastic extrusion base mounting strip has an inverted T-shaped configuration as seen in cross section with opposed flanges extending along opposite sides at the bottom of a vertical web,
   b. said vertical web is positioned adjacent to the insulation base and its raised border,
   c. one of said opposed flanges extends beneath said insulation base and the other of said opposed flanges projects outwardly for use as an attachment member in mounting the collector upon a supporting surface.

27. A solar collector as claimed in claim 26, in which:
   a. a pair of stiffly resilient parallel lips extend along the top of said vertical web defining a groove between them, and
   b. said upper mounting strip has a flange extending over the cover with a depending lip having an enlarged bead running along its lower edge engageable into said groove in a removable snap fit relationship.

28. A solar collected as claimed in claim 25, in which:
   a. said cover sheet is formed of flexible plastic material and said upper mounting strip is made of a stiffly flexible plastic extrusion,
   b. said upper mounting strip being flexibly bonded to said cover sheet, and
   c. said cover sheet together with said upper mounting strip being capable of being rolled up into a roll approximately 4 to 5 feet in diameter.

29. A solar collector for transferring heat from the radiant energy of the sun to a circulating liquid comprising:
   a. a layer of lightweight insulating material forming the insulation base of said collector,
   b. a raised insulating border extending around the perimeter of said base for surrounding said collector,
   c. a cover sheet of solar energy transmitting material extending across the collector from border to border so as to create an enclosed air space within said border and above said insulation base,
   d. detachable mounting means for detachably mounting said cover to said border for removably covering said enclosing air space for providing access into said enclosed air space,
   e. an air dryer having a passage therethrough providing communication between said enclosed air space and the outside of said collector, said passage having a length many times longer than its cross-sectional area, desicant material in said dryer exposed to said passage for removing moisture from air being drawn through said passage into said enclosed air space when the air in said enclosed space contracts upon cooling and for becoming rejuvenated by air being expelled through said passage when the air in said enclosed space expands upon heating,
   f. a multiplicity of closely spaced black flexible tubes running lengthwise of said enclosed air space in a grid pattern,
   g. securing means for holding said flexible tubes extending in a grid pattern on said insulating base, h. supply and return headers extending across said enclosed air space and being connected to the ends of said tubes for providing flow of the circulating liquid through the tubes,
i. said headers having connections adapted for connection to supply and return pipes for circulating liquid flow to a heat utilization system, and
j. said tubes being formed of flexible synthetic material capable of withstanding temperatures over 300° F caused by exposure to hot sunshine in the absence of liquid flow.

* * * * *

REEXAMINATION CERTIFICATE (314th)
United States Patent [19]
MacCracken

[11] B1 4,112,921
[45] Certificate Issued Mar. 19, 1985

[54] METHOD AND SYSTEM FOR UTILIZING A FLEXIBLE TUBING SOLAR COLLECTOR

[75] Inventor: Calvin D. MacCracken, Englewood, N.J.

[73] Assignee: Bio-Energy Systems, Inc., Ellenville, N.Y.

Reexamination Request:
No. 90/000,292, Nov. 22, 1982

Reexamination Certificate for:
Patent No.: 4,112,921
Issued: Sep. 12, 1978
Appl. No.: 846,112
Filed: Oct. 27, 1977

Related U.S. Application Data

[63] Continuation-in-part of Ser. No. 790,484, Apr. 25, 1977, abandoned, which is a continuation-in-part of Ser. No. 692,887, Jun. 4, 1976, abandoned.

[51] Int. Cl.³ .............................................. F24J 3/02
[52] U.S. Cl. ................................. 126/448; 126/450; 126/452; 126/426; 165/176; 165/46
[58] Field of Search ............... 126/450, 448, 432, 442, 126/443, 446, 447, 417; 165/171, 172, 173, 176; 138/118, 120

[56] References Cited

U.S. PATENT DOCUMENTS

| | | | |
|---|---|---|---|
| 2,916,055 | 12/1959 | Brumbach | 138/87 |
| 3,022,781 | 2/1962 | Andrassy | 126/426 |
| 3,648,768 | 3/1972 | Scholl | 165/171 |
| 3,751,935 | 8/1973 | MacCracken et al. | |
| 3,859,980 | 1/1975 | Crawford | 126/426 |
| 3,952,725 | 4/1976 | Edmondson | 126/447 |
| 4,060,070 | 11/1977 | Harter | |

OTHER PUBLICATIONS

Reprint of article in Apr. 30, 1973 issue of Air Conditioning, Heating and Refrigeration News.
Reprint of United States Hockey & Arena Bi 2, vol. 3, No. 4, Apr. 1975.
Handbook of Plastics and Elastomers, Charles A. Harper, McGraw-Hill Inc., 1975, pp. 1-113.
Plastics Extrusion Technology, Second Edition, Reinhold Publishing Corporation, 1962, p. 223.
Modern Plastics Encyclopedia 1982-1983, pp. 484, 485.

*Primary Examiner*—James C. Yeung

[57] ABSTRACT

The practical large scale use of solar energy depends primarily upon the first cost of solar collectors per unit area being greatly reduced below known designs without loss of efficiency. The subject invention introduces a method of making flat plate solar collectors for heating liquid in which the use of metal and glass is almost totally eliminated, weight is greatly reduced, and assembly of the components is done at the site from rolls of flexible materials in lengths to fit the available space. While materials of much lower thermal conductivity than metal are used, the increased surface area and close spacing of liquid tubes provided by employing this invention more than make up for the lower conductivity. Standard insulation board covered with roofing cement and other adhesives serves as the base and frame to hold small synthetic rubber tubes, headers, and flexible cover material made of transparent fiberglass reinforced plastic. Field assembly assures participation of local personnel who are then prepared to sell, service and maintain the system. The cover material may be used in place of roofing across rafters and then insulation board covered with the rubber tubes and adhesive pushed up between the rafters from inside the roof space.

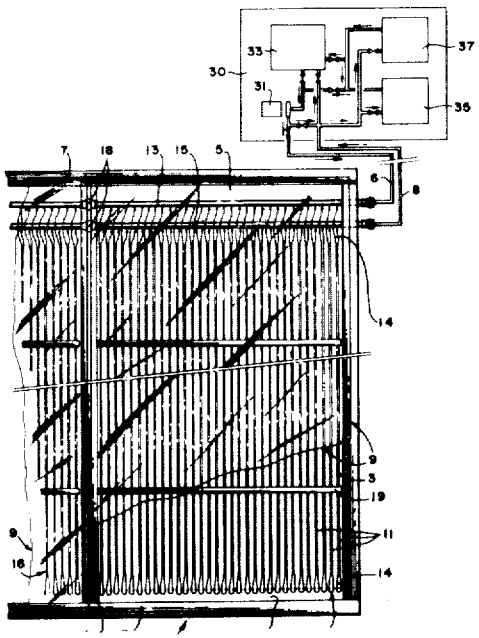

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1-21 and 25-29 is confirmed.

Claims 22-24 are cancelled.

* * * * *